United States Patent [19]

Besenfelder

[11] 3,731,220

[45] May 1, 1973

[54] PHASE LOCKED OSCILLATOR FOR USE WITH VARIABLE SPEED DATA SOURCE

[75] Inventor: Edward R. Besenfelder, Oklahoma City, Okla.

[73] Assignee: Honeywell Information Systems Inc., Waltham, Mass.

[22] Filed: May 30, 1972

[21] Appl. No.: 260,335

[52] U.S. Cl. ..........331/1 A, 331/8, 331/17, 331/18, 331/25, 331/36 R, 331/111, 331/177 R, 340/174.1 A, 340/174.1 H

[51] Int. Cl. ..........H03b 3/04

[58] Field of Search ..........331/1 A, 8, 17, 18, 331/25, 36 R, 111, 177 R; 340/174.1 A, 174.1 H

[56] References Cited

UNITED STATES PATENTS

| | | | |
|---|---|---|---|
| 3,156,874 | 11/1964 | Verdibello | 331/27 |
| 3,559,098 | 1/1971 | Chandos | 331/177 R |
| 3,693,112 | 9/1972 | Briggs | 331/111 |

*Primary Examiner*—Roy Lake
*Assistant Examiner*—Siegfried H. Grimm
*Attorney*—Lloyd B. Guernsey et al.

[57] ABSTRACT

Phase encoded data is retrieved from a magnetic tape or a magnetic disk and used to synchronize an oscillator with the data being read. The frequency of the oscillator can be synchronized over a wide range of frequencies. The basic frequency of the oscillator can be changed over a relatively wide range and the basic frequency can also be divided by 2, by 4 or by 8 so that a wide range of tape speeds may be used in a magnetic tape machine.

12 Claims, 5 Drawing Figures

PHASE LOCKED OSCILLATOR FOR USE WITH VARIABLE SPEED DATA SOURCE

BACKGROUND OF THE INVENTION

This invention relates to magnetic recording systems and more particularly to an oscillator which may be locked or synchronized with data being read from a magnetic tape or from a magnetic disk.

In modern data processing systems data is stored on magnetic tape or magnetic disks for retrieval and use at a later time. It is important that large quantities of data be stored as compactly as possible to minimize the number of reels of tape or the number of disks used with the data processing systems. One of the techniques used to increase the quantity of data which can be stored in a given space is to use phase encoding. In phase encoding data bits are represented by a change in the voltage level. For example, a binary zero may be represented by an increasing signal voltage and the binary one may be represented by a decreasing signal voltage. When a series of binary ones or a series of binary zeros are recorded it is necessary to include a "phase bit" between the binary ones or between the binary zeros. The phase bit may be used to synchronize the data with the oscillator. This synchronization causes the data processing system to read the data at the time the signal voltage level changes so that noise voltages which occur at other times will not introduce errors into the data processing system.

Prior art oscillators can be synchronized with data being read from magnetic tape at several different speeds but these speeds must all be sub-multiples of basic speed. The prior art oscillators cannot be synchronized at other speeds which are between the sub-multiple speeds. The present invention alleviates the disadvantages of the prior art by providing an oscillator which can be synchronized with data over a wide continuous range of magnetic tape speeds.

It is, therefore, an object of this invention to provide a new and improved system for reading data which has been recorded using phase encoding.

Another object of this invention is to provide an oscillator which can be accurately synchronized with phase encoded data which is read from a magnetic tape.

A further object of this invention is to provide an oscillator which can be synchronized with data over a wide range of frequencies.

Still another object of this invention is to provide an oscillator which can be synchronized with phase encoded data over a wide continuous range of frequencies.

SUMMARY OF THE INVENTION

The foregoing objects are achieved in the present invention by providing a phase-locked oscillator which can be synchronized to operate over a wide continuous range of speeds. The oscillator is synchronized to cause data to be read during the time that data is received from the magnetic tape and to cause the phase bit to be read during the time that the phase bit is received.

DESCRIPTION OF THE PREFERRED EMBODIMENT

Figure 1:
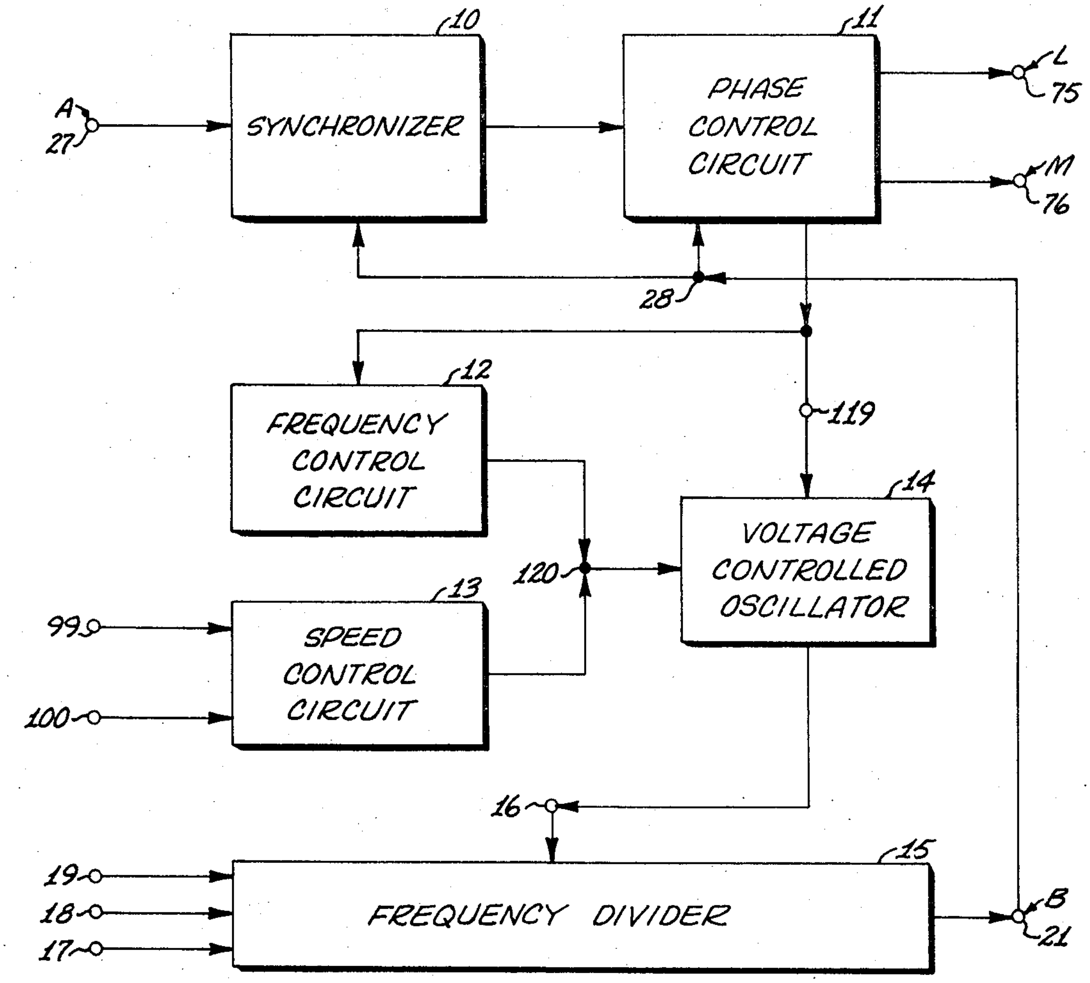
FIG. 1 is a block diagram of one embodiment of the present invention.
Figure 2A:
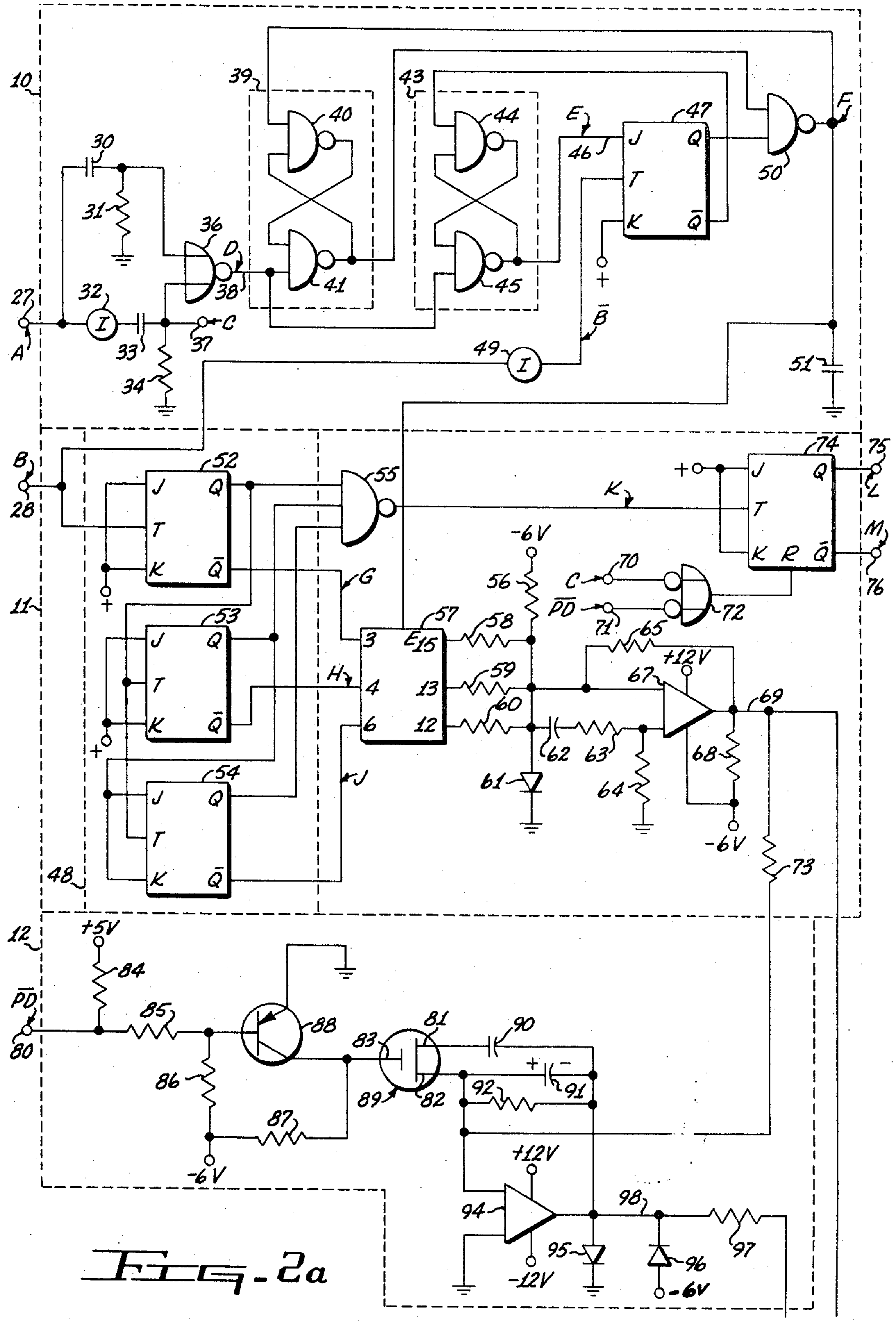
FIGS. 2*a* and 2*b* show a circuit diagram of one embodiment of the present invention.
Figure 2B:
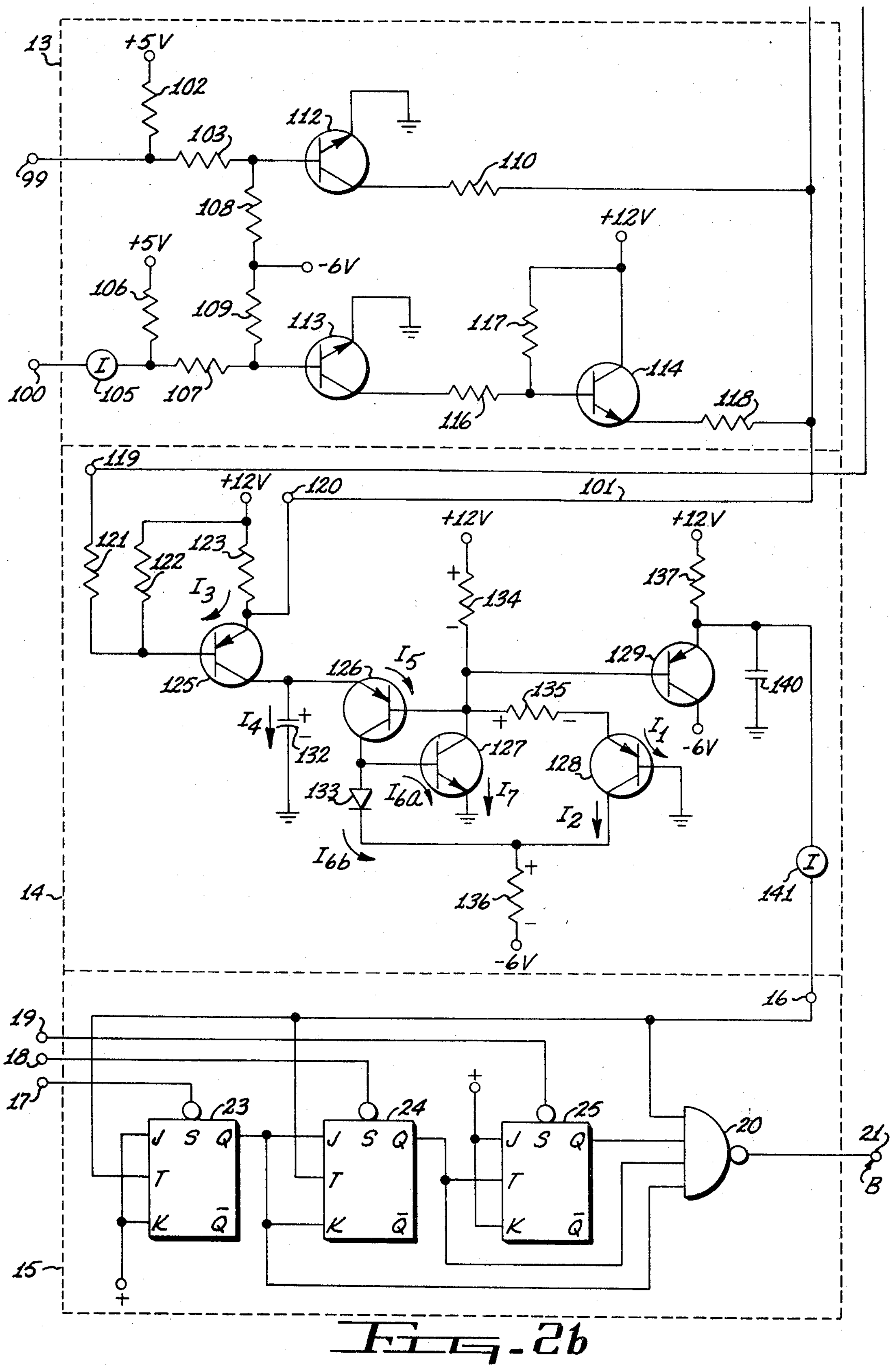

The phase-lock oscillator shown in FIG. 1 develops a wide pulse which can be used to cause data to be read into a data processor. It is important to synchronize the oscillator with incoming data so that each wide pulse is centered around a bit of data. The incoming data is applied to an input terminal 27 and and the wide pulse is coupled to an output terminal 75. The operation of the complete phase-locked oscillator will first be described using block diagrams, then the operation of each of the blocks will be described in more detail. A block diagram of the present invention is shown in FIG. 1 and a detailed circuit of the present invention is shown in FIGS. 2*a* and 2*b*.

The phase-locked oscillator employs a synchronizer 10, a phase control circuit 11, a frequency control circuit 12, a speed control circuit 13, a voltage controlled oscillator 14 and a frequency divider 15. The voltage controlled oscillator 14 develops narrow pulses having a frequency which is much higher than the frequency of the data. These high frequency pulses are applied to a frequency divider 15 which divides the frequency of the pulses from the oscillator by 2, by 4, or by 8. Signals applied to control terminals 17, 18 and 19 of the frequency divider can be used to select the frequency of the pulses from the output terminal of frequency divider. For example, when no signals are applied to terminals 17, 18 and 19 the pulses from the oscillator are gated from input terminal 16 through divider 15 to output terminal 21 so that the frequency of the pulses at terminal 21 is the same as the frequency of the pulses at signal input terminal 16. When a positive voltage is applied to terminal 17 the frequency of the pulses from the oscillator is divided by two so that the output frequency at terminal 21 is half the frequency of the pulses provided by the oscillator 14. When a positive signal is applied to terminal 17 and 18 the frequency of the pulses from the oscillator is divided by 4. When positive signals are applied to terminals 17, 18 and 19 the frequency of the pulses from the oscillator is divided by 8.

The pulses from the phase-locked oscillator can be synchronized with data from a magnetic tape system or from a magnetic disk system. The phase-locked oscillator can be synchronized with data from a tape moving at 150 inches per second (ips), at 75 ips, 37¾ ips, 18_2 ips, or any speed between 150 ips and 18¾ ips. The frequency control circuit 12 and the speed control circuit 13 may also cause the basic frequency of the oscillator to increase so that it is useful with a tape speed greater than 150 ips or they may cause the basic frequency to decrease so that it is useful with tape speeds of less than 150 ips or sub-multiples thereof. For example, the basic frequency could be used with 160 ips and sub-multiples used with 80 ips or 40 ips or 20 ips. The basic frequency could also be used with a slower speed such as 140 ips and with sub-multiples of 140 ips. Of course, any other speed could also be used such as 143½ ips. It is not necessary for a magnetic tape system to use the basic speeds listed above; however, these basic speeds are commonly used in the data processing industry. Prior art oscillators develop pulses for use with 150 ips or with sub-multiples of 150 ips but are not useful with speeds between 150 ips and the sub-multiples of 150 ips.

The pulses from output terminal 21 of the frequency divider 15 are applied to the input terminal 28 of the synchronizer 10 and are synchronized with the data pulses which are applied to the signal input terminal 27. These two signals are combined in the synchronizer and provide a pulse which is coupled to the phase control circuit 11, where it is compared with the phase of the pulses from the frequency divider 15. The phase control circuit 11 provides a voltage which controls the frequency and the phase of the oscillator so that the output of the oscillator and of the frequency divider 15 are synchronized with the data pulses applied to input terminal 27 of the synchronizer.

The theory of operation of the voltage controlled oscillator 14 and the frequency divider of FIG. 2*b* will be first described followed by the description of the circuits which control the frequency and the phase of the output pulses from the voltage controlled oscillator.

When power is initially applied to the voltage controlled oscillator a current $I_1$ flows from the +12 volts through resistors 134 and 135, from the emitter to the base of transistor 128 thereby rendering transistor 128 conductive. When transistor 128 is conductive a current $I_2$ flows from the +12 volts through resistors 134 and 135, from the emitter to collector of transistor 128 through resistor 136 to the −6 volts. Current $I_2$ provides a voltage of the polarity shown across resistor 135 so that the voltage at the base of transistor 126 is positive causing transistor 126 to be nonconductive. At this same time a $I_3$ current flows from the +12 volt source through resistor 123, from the emitter to base of transistor 125 thereby rendering transistor 125 conductive. When transistor 125 is conductive a current $I_4$ flows from the +12 volt source through resistor 123, from emitter to collector of transistor 125 to the upper plate of capacitor 132, thereby charging capacitor 132 to the polarity shown. When the voltage across capacitor 132 increases so that the voltage on the emitter of transistor 126 is more positive than the voltage on the base a current $I_5$ flows from the upper plate of capacitor 132 through emitter to base of transistor 126 thereby rendering transistor 126 conductive.

When transistor 126 is conductive a current $I_6$ flows from the upper plate of capacitor 132, from emitter to collector of transistor 126 where the current divides. A portion of the current $I_{6A}$ flows from the base to emitter of transistor 127 thereby rendering transistor 127 conductive. When transistor 127 is rendered conductive the voltage at the collector of transistor 127 is approximately +.2 volts. This voltage is not large enough to cause transistor 128 to be conductive so that current $I_1$ no longer flows through resistor 135 and from the emitter to the base of transistor 128, thereby rendering transistor 128 nonconductive. Current $I_6$ causes capacitor 132 to quickly discharge so that the voltage on the emitter of transistor 126 decreases. The decrease in voltage on the emitter of transistor 126 causes a decrease in the value of current $I_5$ and in current $I_6$.

When current $I_6$ decreases, current $I_{6A}$ decreases so that the current $I_7$ through resistor 134 and transistor 127 decreases. The decrease in current through resistor 134 causes a decrease in the voltage drop across resistor 134. The decrease in voltage drop across resistor 134 increases the voltage at the collector of transistor 127 so that current $I_1$ again flows through resistor 135 and emitter to base of transistor 128 rendering transistor 128 conductive.

This entire cycle is repeated at a rapid rate causing the voltage at the collector of transistor 127 to increase and decrease. The rate at which capacitor 132 recharges determines the rate or frequency at which the cycle is repeated. An increase in voltage on the emitter of transistor 125 causes an increase in current $I_4$ through transistor 125 so that capacitor 132 charges rapidly and causes an increase in the frequency of operation. An increase in voltage on the base of transistor 125 causes a decrease in current through transistor 125 and causes a decrease in the frequency of operation. The increase and decrease in voltage at the collector of transistor 127 causes the transistor 129 to be alternately rendered conductive and nonconductive so that pulses of voltage are developed at the emitter of transistor 129. These pulses from the emitter of transistor 129 are inverted by inverter 141 and applied to the input terminal 16 of the frequency divider 15.

Frequency divider 15 includes a plurality of JK flip-flops or bistable multivibrators 23, 24 and 25 and a NAND-gate 20. The JK flip-flop is a circuit which is adapted to operate in either one of two stable states and to transfer from the state in which it is operating to the other stable state upon the application of a trigger signal thereto. In one state of operation the JK flip-flop represents a binary one and in the other state it represents a binary zero. The three leads entering the left side of the flip-flop symbol, for example, flip-flop 23, provide the required trigger signals. When the J and K input leads are both positive a positive trigger signal on the T lead causes the flip-flop to change states when a negative voltage is also applied to the S input lead. When a positive signal is applied to the S lead the JK flip-flop remains in the set state so that a positive potential is developed at the Q output lead.

In the circuit of FIG. 2*b* an inverter, as shown by the circle adjacent the flip-flop, is connected between each of the control terminals 17–19 and the S input lead. A positive voltage on the control terminal causes a low or negative voltage to be coupled to the S input lead and a low or negative voltage on the control terminal causes a positive voltage to be coupled to the S input lead of the flip-flop. For example, in the frequency divider 15 when there are no voltages applied to the control input terminals 17, 18 and 19 the inverters provide a positive voltage to the S input leads so that flip-flops 23, 24 and 25 are in the set state. When the flip-flops are in a set state a positive potential is developed at the Q output leads of each of the three flip-flops. These positive potentials from the Q output leads enable NAND-gate 20 so that each of the positive pulses applied to input terminal 16 is coupled through NAND-gate 20 and inverted to provide a negative pulse at the output terminal 21. Some flip-flops do not provide the S lead, for example, the flip-flops 52–54 of the phase control circuit 11, do not provide the S lead.

The NAND-gate disclosed in FIG. 2*b* provides the logical NAND function for input logic signals applied to its input leads. In the system disclosed, a binary 1 is represented by a positive signal, the NAND-gate provides an output signal of approximately zero volts representing a binary 0, when and only when, all of the input signals applied to its input leads are positive and represent binary 1's. Conversely, the NAND-gate provides a positive output signal representing a binary 1 when one or more of the input signals applied thereto represent binary 0's.

When a positive potential is applied to the control input terminal 17, flip-flop 23 changes state each time that a pulse is applied to the T input lead of flip-flop 23. This causes the flip-flop 23 to provide a positive signal on the Q output lead for alternate pulses at the input terminal 16. The signal from flip-flop 23 causes the NAND-gate 20 to be enabled on alternate input pulses so that alternate pulses from terminal 16 are coupled through the NAND-gate and the frequency of the pulses at the output terminal 21 is one-half of the frequency of the pulses at the input terminal 16. When a positive potential is applied to control terminals 17 and 18 flip-flop 23 changes state each time a pulse is applied to the T input lead of flip-flop 23 and flip-flop 24 changes state for alternate pulses on the T input lead of flip-flop 24.

The Q output of flip-flop 23 is connected to the J and K input leads of flip-flop 24 so that flip-flop 24 changes states only when voltage on the Q lead of flip-flop 23 is positive. This causes the frequency of the signal from the Q lead of flip-flop 24 to be one-half of the frequency of the signal on the Q lead of flip-flop 23. Since the frequency of the output pulses at the Q lead of 23 is one-half of the frequency of the pulses from the voltage controlled oscillator 14 the frequency of the pulses from the Q output lead of flip-flop 24 is one-fourth of the frequency of the pulses from the voltage controlled oscillator. Pulses from flip-flop 24 enable the NAND-gate 20 on every fourth pulse from the voltage controlled oscillator so that the frequency of the pulses at the output terminal 21 is one-fourth of the frequency of the pulses at input terminal 16. In a like manner when control terminals 17, 18 and 19 each have a positive potential the frequency of the positive voltage on the Q lead of flip-flop 25 is one-eighth of the frequency of the pulses at the terminal 16 thereby enabling the NAND-gate 20 on every eighth pulse. This causes the frequency of the pulses at output terminal 21 to be one-eighth of the frequency of the pulses applied to input terminal 16 of the frequency divider 15.

Figure 3:
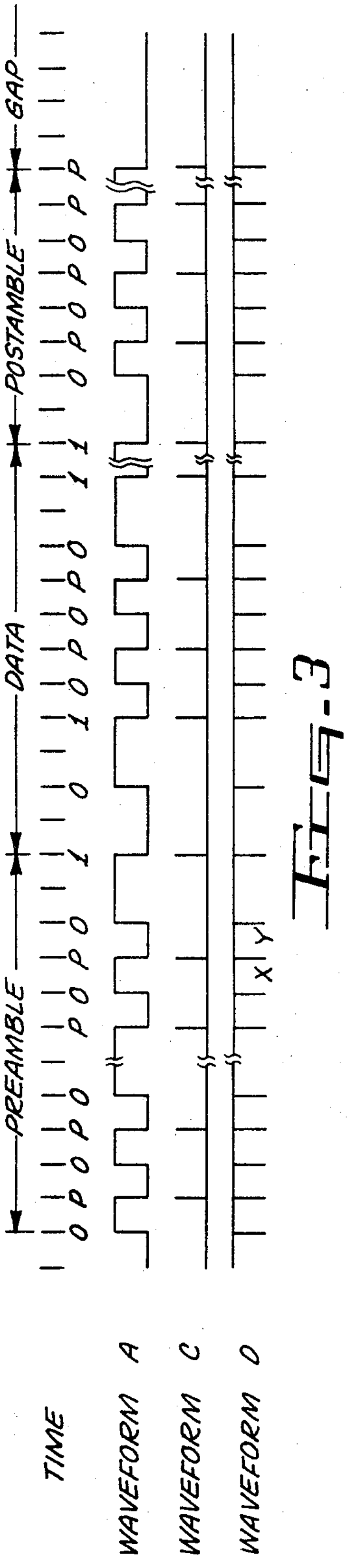
FIGS. 3 and 4 illustrate waveforms which are useful in explaining the operation of the invention shown in FIGS. 1 and 2.

Details of synchronizing the oscillator with the incoming data will now be discussed in connection with the waveform shown in FIGS. 3 and 4. The data shown in waveform A of FIG. 3 is divided into four major parts comprising: the preamble which includes 40 zeros followed by a binary one, the information portion which may have both binary 1's and binary 0's along with a phase bit, a postamble which comprises a binary 1 followed by 40 binary 0's, and a gap or space between the records of data. The gap is represented by a continuously low value of voltage. Marks representing even intervals of time are shown at the top of FIG. 3. It will be noted that a data bit may be alternated with a phase bit. When the data bit is a binary zero the voltage is increasing during the data time and when the data is a binary one the voltage is decreasing during the data time. The phase bit is included only when it is necessary to change the level of the waveform A in order to provide a new data bit. Immediately under the time intervals, 0's, 1's and P's are used to show when binary zeros, binary ones and phase bits and included in waveform A.

The binary data which is represented by waveform A is applied to the input terminal 27 of the synchronizer 10 and is coupled through a pair of integrators to a NOR-gate 36. A positive going waveform which represents a binary zero is coupled through capacitor 30 and develops a positive pulse across resistor 31. The negative going voltages of waveform A are inverted by inverter 32 and coupled through capacitor 33 to develop a positive pulse across resistor 34. The voltage across resistor 34 which is represented by waveform C of FIG. 3 is coupled to an output terminal 37. The voltage pulses across resistor 31 and the voltage pulse across resistor 34 are combined by the NOR-gate 36 to produce the voltage shown in waveform D of FIG. 3. Each of the negative pulses of waveform D causes a positive bit to be stored in latches 39 and 43 until the next pulse of waveform $\overline{B}$ is received from the frequency divider 15. For example, prior to time $t_6$ of FIG. 4 a positive voltage on lead 38 provides an enable signal to gate 41 of latch 39. A positive voltage from NAND-gate 50 is applied to the upper lead of gate 40 and a negative voltage from gate 41 is applied to the lower lead of gate 40. The voltage on the output lead of gate 40 is positive voltage which is applied to the upper lead of gate 41. In latch 43 a positive voltage from the $\overline{Q}$ lead of flip-flop 47 is applied to the upper lead of gate 44 and a negative voltage from gate 45 is applied to the lower lead of gate 44, thereby causing gate 44 to provide a positive voltage to the upper lead of gate 45.

Figure 4:
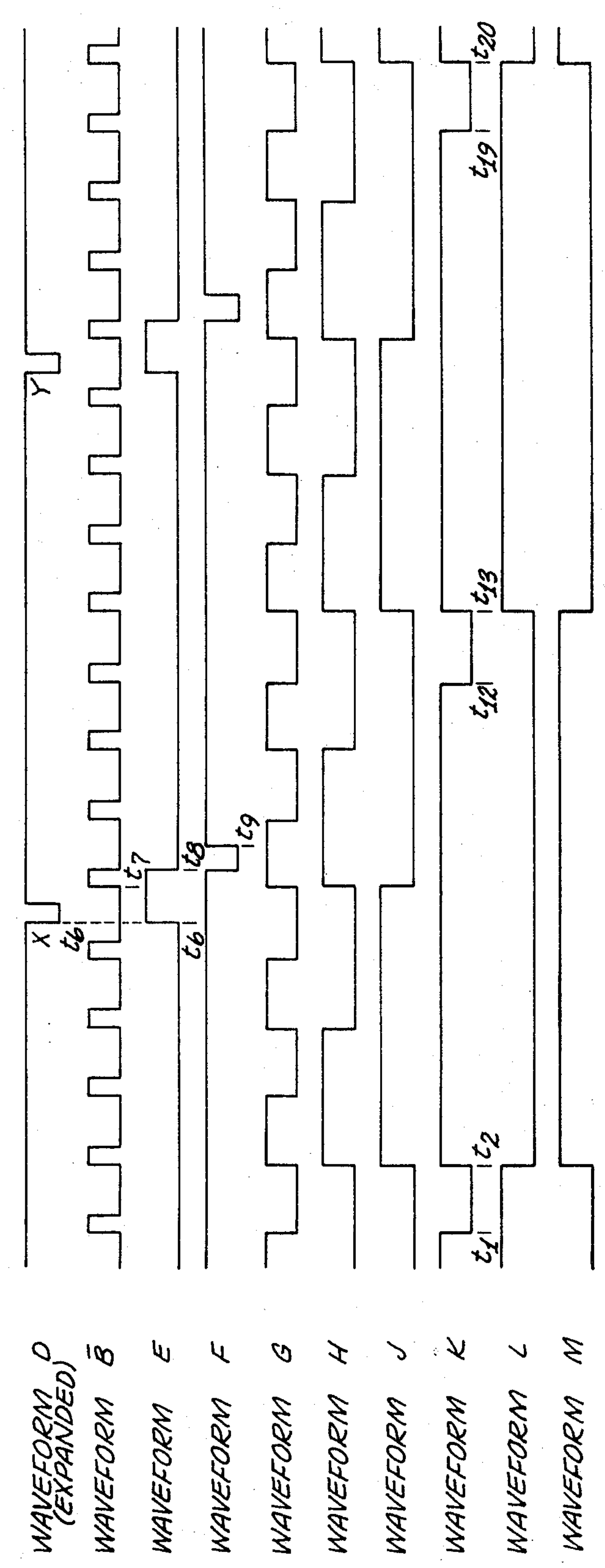

At time $t_6$ of FIG. 4 a negative pulse of waveform D is applied to the lower leads of gate 41 of latch 39 and to gate 45 of latch 43. The negative pulse causes gates 41 and 45 to provide a positive voltage at the output leads of these gates. The positive voltage from gate 41 enables gate 50. The positive voltage from gate 45 is applied to the J lead of flip-flop 47 so that the next trigger pulse of waveform $\overline{B}$ sets flip-flop 47 at time $t_7$. When flip-flop 47 is set the voltage at the Q output lead is positive. This positive voltage causes gate 50 to provide a negative pulse as shown in waveform F of FIG. 4. Thus, the output pulse from gate 50 is synchronized with the pulse from the output terminal 21 of the frequency divider 15. The negative output pulse from gate 50 causes gate 40 of latch 39 to provide a positive voltage to the upper lead of gate 41. At time $t_9$ the positive voltage of waveform D and the positive voltage from gate 40 cause gate 41 to provide a negative output voltage which disables gate 50 so that the voltage on the output lead of gate 50 is again positive. The negative pulse from gate 50 has reset latch 39. The next pulse on the T lead of flip-flop 47 resets flip-flop 47 so that the voltage on the $\overline{Q}$ output lead is low. This low voltage resets latch 43 so that the voltage on the output lead of gate 45 is low.

The pulses of waveform B from terminal 28 are also applied to a counter 48 which includes flip-flops 52, 53 and 54. The count in this counter progresses from zero through seven and back to zero again. The output from the $\bar{Q}$ lead of each of the flip-flops 52, 53 and 54 changes as the count changes so that the voltages shown in waveforms G, H and J are applied to the input leads of the summing circuit which includes the 3-bit latch 57 and resistors 58, 59 and 60. The signals on the three input leads to the latch 57 are gated into the latch by the pulse of waveform F which is applied to the enable lead of the bi-stable latch. The voltage from the summing circuit is applied to the input lead of the amplifier 67 thereby causing the amplifier to provide a voltage on the output lead 69. The voltage on lead 69 is applied to amplifier 94 and to an integrating circuit which includes resistor 92 and capacitor 91. The voltage on the output lead 69 of the amplifier 67 will vary as the count on the output leads of the 3 -bit latch varies in comparison to the trigger pulse shown in waveform F.

Details of the operation of the counter and the 3-bit latch are shown in Table A below. On a count of zero, flip-flops 52, 53 and 54 are set so that the $\bar{Q}$ output leads of flip-flops 52, 53 and 54 have a voltage near zero. The next pulse at terminal 28 resets flip-flop 52 so that the voltage on the $\bar{Q}$ output lead is positive and produces a count of 1 in the counter. The following pulse (count of 2) sets flip-flop 52 and produces a positive voltage on the Q output lead of flip-flop 52 which causes flip-flop 53 to be reset. This process continues as pulses are received at terminal 28. On a count of four, a positive voltage from the Q lead of flip-flop 52 and a positive voltage from the Q lead of flip-flop 53 cause flip-flop 54 to be reset. The $\bar{Q}$ output leads provide voltages to input leads 3, 4 and 6 of the 3-bit latch. A typical latch which can be used is the 9314 which is available from several manufacturers of integrated circuits. The circuit of the 9314 is described in the booklet, "Fairchild TTL Family", 1970 by Fairchild Semiconductor, Mountain View, California.

The frequency of the pulses from oscillator 14 is determined by the value of voltage applied to the emitter of transistor 125 and by the value of voltage applied to the base of transistor 125. A larger positive value of voltage on the emitter of transistor 125 causes capacitor 132 to charge more rapidly and causes the voltage controlled oscillator 14 to operate at a higher frequency. A larger positive value of voltage on the base of transistor 125 causes capacitor 132 to charge at a lower rate and lowers the frequency of pulses from oscillator 14.

When the input leads 3, 4 and 6 of latch 57 have a count of 3 or 4 at the time the enable pulse is received at the enable input lead (lead E) the voltage at the output lead of amplifier 67 causes oscillator 14 to continue to oscillate at the same frequency. When the count at the input leads of latch 57 is 5, 6 or 7 at the time the enable pulse is received the voltage on output lead 69 becomes more positive. This increased voltage is coupled to the base of transistor 125 causing the charging rate of capacitor 132 to decrease and slightly reducing the frequency of oscillator 14. When the count at the input leads of latch 57 is 0, 1, or 2 at the time an enable pulse is received, the voltage on output lead 69 of amplifier 67 is reduced causing the frequency of oscillator 14 to increase. Thus, the voltage from amplifier 67 causes the oscillator to "lock-in" so that the enable pulse to latch 57 is received on a count of 3 or 4 each time.

Frequency control circuit 12 aids in locking in the oscillator with the data signals. The voltage from the output lead of amplifier 67 is coupled to an integrator which includes resistor 92 and capacitor 91. This integrator smoothes out the variations in voltage from amplifier 67. The smoothed voltage is amplified and inverted by amplifier 94 and applied to the emitter of transistor 125 in the oscillator 14.

TABLE A.—OPERATION OF COUNTER 48 and LATCH 57

| | Flip-flop | | | Flip-flop | | | Flip-flop | | | | To latch 57 | | | |
|---|---|---|---|---|---|---|---|---|---|---|---|---|---|---|
| Count | 52 | Q | $\bar{Q}$ | 53 | Q | $\bar{Q}$ | 54 | | Q | $\bar{Q}$ | $\bar{Q}$52 | $\bar{Q}$53 | $\bar{Q}$54 | E |
| 0 | Set | + | | Set | + | | T | Set | + | | | | | 0 |
| 1 | Reset | | + | Set | + | | | Set | + | | + | | | 1 |
| 2 | Set | + | | Reset | | + | T | Set | + | | | + | | 2 |
| 3 | Reset | | + | do | | + | | Set | + | | + | + | | 3 |
| 4 | Set | + | | Set | + | | T | Reset | | + | | | + | 4 |
| 5 | Reset | | + | Set | + | | | do | | + | + | | + | 5 |
| 6 | Set | + | | Reset | | + | T | do | | + | | + | + | 6 |
| 7 | Reset | | + | do | | + | | do | | + | + | + | + | 7 |

A negative pulse of voltage from gate 50 of the synchronizer 10 causes the voltage from flip-flops 52, 53 and 54 to be gated into the latch 57. The count at the time of the gating pulse determines the voltage at the output leads of latch 57 and at the input lead of amplifier 67. When the value of resistance of resistor 58 is twice the value of resistor 59 and four times the value of resistor 60, the relative voltage applied to the input lead of amplifier 67 are as shown in the last column at the right of Table A. The voltage from latch 57 is amplified by amplifier 67 and coupled to the frequency control circuit 12 where variations in voltage are filtered by capacitor 91. The voltage across capacitor 91 determines the output voltage from the amplifier 94 in the frequency control circuit. The voltage on the output lead 98 of amplifier 94 is coupled through resistor 97 to the oscillator and determines the frequency of the pulses developed by the oscillator 14.

The basic frequency of the oscillator can be changed by applying signals to speed-control terminals 99 and 100 in the speed-control circuit 13. When a positive voltage is applied to terminal 99 transistor 112 is rendered conductive so that the voltage on the collector of transistor 112 decreases. A decrease in voltage on the collector of transistor 112 decreases the voltage on emitter of transistor 125 of the voltage controlled oscillator 14 so that capacitor 132 charges at a slower rate thereby decreasing the frequency of the oscillator. When a positive voltage is applied to speed-control terminal 100 the signal is inverted by inverter 105 and causes transistor 113 to be rendered nonconductive. When transistor 113 is rendered nonconductive the voltage at the collector of transistor 113 and at the base of transistor 114 increases. When the voltage on the base of transistor 114 increases the base to emitter current of transistor 114 increases so that the conductively of transistor 114 increases. This causes an increase in voltage on the emitter of transistor 114 and an increase in voltage on the emitter of transistor 125 in the voltage controlled oscillator 14. An increase in voltage on the emitter of transistor 125 causes capacitor 132 to charge more rapidly and increase the frequency of oscillator 14.

The pulses in a preamble of waveform A are used to stabilize the frequency of the oscillator 14 so that the input of the oscillator is synchronized with the data pulses shown in waveform A of FIG. 3. During the time of the preamble the capacitor 91 in the frequency control circuit 12 is charging to the polarity shown in FIG. 2*a*. This capacitor 91 is small so that the voltage across the capacitor changes to the desired voltage rather rapidly. Once synchronization has been achieved it is desired that this voltage across capacitor 91 be changed much more slowly. This can be done by adding a capacitor 90 in parallel with capacitor 91. The circuit which includes transistors 88 and MOSFET 89 causes capacitor 90 to be connected in parallel with capacitor 91 once synchronization has been achieved. The metal-oxide-semiconductor field-effect transistor or MOSFET is a semiconductor device having a source, drain and a gate. The MOSFET can be used as an ON-OFF switch. When the voltage on the gate of the MOSFET of FIG. 2 is the same as the voltage on the source or when the voltage on the gate is more positive than the voltage on the source the MOSFET cannot conduct current between the source and the drain. When a negative voltage greater than a "threshold voltage" is applied to the gate the MOSFET turns on and current can flow from the source to the drain or from the drain to the source. The MOSFET shown in FIG. 2*a* has a source 81, a drain 82 and a gate 83.

During the first part of the preamble the signal $\overline{PD}$ applied to signal-input terminal 80 has a negative value so that the transistor 88 is rendered conductive and a voltage near ground potential is applied to the gate of the MOSFET turning off the MOSFET 89. When the waveform A reaches the middle of the preamble a circuit (not shown) provides a positive voltage on input terminal 80 so that transistor 88 is rendered nonconductive. When transistor 88 is rendered nonconductive the voltage on the collector of transistor 88 and on the gate 83 of MOSFET 89 is negative causing MOSFET 89 to be rendered conductive or tuned on. When MOSFET 89 is turned on capacitor 90 is connected in parallel with capacitor 91 so that the total capacity of the frequency control circuit is increased.

The phase control circuit 11 includes a NAND-gate 55 and a flip-flop 74 that provide signals which cause data bits and phase bits to be alternately read by the data processing system. The flip-flops 52, 53 and 54 of counter 48 provide positive signals to NAND-gate 55 on a count of zero as shown in Table A. These positive signals cause gate 55 to provide a negative voltage to the trigger lead of flip-flop 74 thereby causing flip-flop 74 to change states on each count of zero. For example, in FIG. 4 between times $t_1$ and $t_2$, when the count is zero, a negative pulse is applied to the trigger lead of flip-flop 74 so that flip-flop 74 produces a positive signal on output terminal M. On the next count of zero, between times $t_{12}$ and $t_{13}$, a flip-flop again changes states at the end of the zero count. This causes flip-flop 74 to provide a positive signal on output terminal 75 at time $t_{13}$. The positive signals on terminal 75 cause data bits to be read by a data processor and the positive signals on terminal 76 cause phase bits to be read. Signals on the R lead of the flip-flop 74 may be used to reset the flip-flop.

While the principles of the invention have been made clear in an illustrative embodiment, there will be many obvious modifications of the structure, proportions, materials and components without departing from those principles. The appended claims are intended to cover any such modifications.

What is claimed is:

1. A phase-locked oscillator for use with a source of data signals, said oscillator comprising:

first, second, third, fourth and fifth transistors each having a base, a collector and an emitter;

first, second and third reference potentials;

a capacitor, said capacitor being connected between said second potential and said collector of said first transistor, said collector of said first transistor being connected to said emitter of said second transistor;

first, second, third, fourth and fifth resistors, said first resistor being connected between said first potential and said emitter of said first transistor, said second resistor being connected between said base of said second transistor and said emitter of said fourth transistor, said base of said fourth transistor being connected to said second potential, said third resistor being connected between said first potential and said collector of said third transistor, said collector of said third transistor being connected to said base of said second transistor, said collector of said second transistor being connected to said base of said third transistor, said emitter of said third transistor being connected to said second potential;

a diode, said diode being connected between said collector of said second transistor and said collector of said fourth transistor, said fourth resistor being connected between said third potential and said collector of said fourth transistor;

a first speed-control terminal, said first speed-control terminal being coupled to said base of said fifth transistor, said emitter of said fifth transistor being connected to said second potential, and said fifth resistor being connected between said collector of said fifth transistor and said emitter of said first transistor; and an oscillator output lead, said oscillator output lead being coupled to said collector of said third transistor.

2. A phase-locked oscillator for use with a source of data signals as defined in claim 1 including:

a sixth transistor having a base, a collector and an emitter;

a sixth resistor, said sixth resistor being connected between said emitter of said sixth transistor and said emitter of said first transistor, said collector of said sixth transistor being connected to said first potential; and a second speed-control terminal, said second speed-control terminal being connected to said base of said sixth transistor.

3. A phase-locked oscillator for use with a source of data signals as defined in claim 1 including:

a 3-bit latch having first, second and third set-input leads, an enable-input lead and first, second and third output leads;

a counter having an input lead and first, second and third output leads, said input lead of said counter being coupled to said collector of said third transistor, said output leads of said counter each being connected to a corresponding one of said set-input leads of said latch;

a summing circuit having first, second and third input leads and an output lead, each of said leads of said summing circuit being connected to a corresponding one of said output leads of said latch, said output lead of said summing circuit being coupled to said base of said first transistor; and a signal-input terminal, said input terminal being coupled to said enable-input lead of said latch, said input terminal being coupled to said source.

4. A phase-locked oscillator for use with a source of data signals as defined in claim 1 including:

a frequency divider having a signal-input terminal, a signal-output terminal and first, second and third control terminals;

a seventh transistor having a base, a collector and an emitter, said base of said seventh transistor being connected to said collector of said third transistor, said collector of said seventh transistor being connected to said third potential; and a seventh resistor, said seventh resistor being connected between said first potential and said emitter of said seventh transistor, said emitter of said seventh transistor being coupled to said input terminal of said divider.

5. A phase-locked oscillator for use with a source of data signals as defined in claim 1 including:

a 3-bit latch having first, second and third set-input leads, an enable-input lead and first, second and third output leads;

a counter having an input lead and first, second and third output leads, said input lead of said counter being coupled to said collector of said third transistor, said output leads of said counter each being connected to a corresponding one of said set-input leads of said latch;

a summing circuit having first, second and third input leads and an output lead, each of said input leads of said summing circuit being connected to a corresponding one of said output leads of said latch, said output lead of said summing circuit being coupled to said base of said first transistor;

a signal-input terminal, said input terminal being coupled to said enable-input lead of said latch, said input terminal being coupled to said source;

a second capacitor;

an eighth resistor; and an amplifier having an input lead and an output lead, said second capacitor and said eighth resistor each being connected between said input lead of said amplifier and said output lead of said amplifier, said input lead of said amplifier being coupled to said output lead of said summing circuit, said output lead of said amplifier being coupled to said emitter of said first transistor.

6. A phase-locked oscillator for use with a source of data signals as defined in claim 1 including:

a 3-bit latch having first, second and third set-input leads, an enable-input lead and first, second and third output leads;

a counter having an input lead and first, second and third output leads, said input lead of said counter being coupled to said collector of said third transistor, said output leads of said counter each being connected to a corresponding one of said set-input leads of said latch;

a summing circuit having first, second and third input leads and an output lead, each of said input leads of said summing circuit being connected to a corresponding one of said output leads of said latch, said output lead of said summing circuit being coupled to said base of said first transistor;

a signal-input terminal, said input terminal being coupled to said enable-input lead of said latch, said input terminal being coupled to said source;

second and third capacitors;

an amplifier having an input lead and an output lead, said input lead of said amplifier being coupled to said output lead of said summing circuit, said second capacitor being connected between said input lead of said amplifier and said output lead of said amplifier;

a field-effect transistor having a source, a drain and a gate, a first lead of said third capacitor being connected to said output lead of said amplifier, a second lead of said third capacitor being connected to said source of said field-effect transistor, said drain of said field-effect transistor being connected to said input lead of said amplifier; and a third speed-control terminal, said third speed-control terminal being coupled to said gate of said field-effect transistor, said output lead of said amplifier being coupled to said emitter of said first transistor.

7. A phase-locked oscillator for use with a source of data signals as defined in claim 1 including:

a 3-bit latch having first, second and third set-input leads, an enable-input lead and first, second and third output leads;

a counter having an input lead and first, second and third output leads, said input lead of said counter being coupled to said collector of said third transistor, said output leads of said counter each being connected to a corresponding one of said set-input leads of said latch;

a summing circuit having first, second and third input leads and an output lead, each of said input leads of said summing circuit being connected to a corresponding one of said output leads of said latch, said output lead of said summing circuit being coupled to said base of said first transistor; and a signal-input terminal;

differentiating means;

first and second latching means each having first and second input leads and an output lead, said differentiating means being connected between said signal-input terminal and said first input leads of said first and said second latching means;

a flip-flop having first and second input leads and first and second output leads, said output lead of said first latching means being connected to said first input lead of said flip-flop, said second output lead of said flip-flop being connected to said second input lead of said first latching means; and a NAND-gate having first and second input leads and an output lead, said output lead of said second latching means being connected to said first input lead of said gate, said first output lead of said flip-flop being connected to said second input lead of said gate, said second input lead of said second latching means being connected to said output lead of said gate, said second input lead of said flip-flop being coupled to said oscillator output lead, said output lead of said gate being connected to said enable-input lead of said latch.

8. A phase-locked oscillator for use with a source of data signals as defined in claim 1 including:

a 3-bit latch having first, second and third set-input leads, an enable-input lead and first, second and third output leads;

a counter having an input lead and first, second and third output leads, said output leads of said counter each being connected to a corresponding one of said set-input leads of said latch;

a summing circuit having first, second and third input leads and an output lead, each of said input leads of said summing circuit being connected to a corresponding one of said output leads of said latch, said output lead of said summing circuit being coupled to said base of said first transistor;

a signal-input terminal, said input terminal being coupled to said enable-input lead of said latch, said input terminal being coupled to said source;

a frequency divider having a signal-input terminal, a signal-output terminal and first, second and third control terminals;

a seventh transistor having a base, a collector and an emitter, said base of said seventh transistor being connected to said collector of said third transistor, said collector of said seventh transistor being connected to said third potential; and a seventh resistor, said seventh resistor being connected between said first potential and said emitter of said seventh transistor, said emitter of said seventh transistor being coupled to said input terminal of said divider, said output terminal of said divider being connected to said input lead of said counter.

9. A phase-locked oscillator for use with a source of data signals as defined in claim 1 including:

a 3-bit latch having first, second and third set-input leads, an enable-input lead and first, second and third output leads;

a counter having an input lead and first, second and third output leads, said output leads of said counter each being connected to a corresponding one of said set-input leads of said latch;

a summing circuit having first, second and third input leads and and output lead, each of said input leads of said summing circuit being connected to a corresponding one of said output leads of said latch, said output lead of said summing circuit being coupled to said base of said first transistor;

a signal-input terminal, said input terminal being coupled to said enable-input lead of said latch, said input terminal being coupled to said source;

second and third capacitors;

an amplifier having an input lead and output lead, said input lead of said amplifier being coupled to said output lead of said summing circuit, said second capacitor being connected between said input lead of said amplifier and said output lead of said amplifier;

a field-effect transistor having a source, a drain and a gate, a first lead of said third capacitor being connected to said output lead of said amplifier, a second lead of said third capacitor being connected to said source of said field-effect transistor, said drain of said field effect transistor being connected to said input lead of said amplifier;

a third speed-control terminal, said third speed-control terminal being coupled to said gate of said field-effect transistor, said output lead of said amplifier being coupled to said emitter of said first transistor;

a frequency divider having a signal-input terminal, a signal-output terminal and first, second and third control terminals, said input terminal of said divider being coupled to said oscillator output lead, said output terminal of said divider being coupled to said input lead of said counter.

10. A phase-locked oscillator for use with a source of data signals as defined in claim 1 including:

a 3-bit latch having first, second and third set-input leads, an enable-input lead and first, second and third output leads;

a counter having an input lead and first, second and third output leads, said output leads of said counter each being connected to a corresponding one of said set-input leads of said latch;

a summing circuit having first, second and third input leads and an output lead, each of said input leads of said summing circuit being connected to a corresponding one of said output leads of said latch, said output lead of said summing circuit being coupled to said base of said first transistor;

a signal-input terminal, said input terminal being coupled to said enable-input lead of said latch, said input terminal being coupled to said source;

second and third capacitors;

an amplifier having an input lead and an output lead, said input lead of said amplifier being coupled to said output lead of said summing circuit, said second capacitor being connected between said input lead of said amplifier and said output lead of said amplifier;

a field-effect transistor having a source, a drain and a gate, a first lead of said third capacitor being connected to said output lead of said amplifier, a second lead of said third capacitor being connected to said source of said field-effect transistor, said drain of said field-effect transistor being connected to said input lead of said amplifier;

a third speed-control terminal, said third speed-control terminal being coupled to said gate of said field-effect transistor, said output lead of said amplifier being coupled to said emitter of said first transistor;

a frequency divider having a signal-input terminal, a signal-output terminal and first, second and third control terminals; a seventh transistor having a base, a collector and an emitter, said base of said seventh transistor being connected to said collector of said third transistor, said collector of said seventh transistor being connected to said third potential; and a seventh resistor, said seventh resistor being connected between said first potential and said emitter of said seventh transistor, said emitter of said seventh transistor being coupled to said input terminal of said divider, said output terminal of said divider being connected to said input lead of said counter.

11. A phase-locked oscillator for use with a source of data signals as defined in claim 1 including:

a 3-bit latch having first, second and third set-input leads, enable-input lead and first, second and third output leads;

a counter having an input lead and first, second and third output leads, said input lead of said counter being coupled to said collector of said third transistor, said output leads of said counter each being connected to a corresponding one of said set-input leads of said latch;

a summing circuit having first, second and third input leads and an output lead, each of said input leads of said summing circuit being connected to a corresponding one of said output leads of said latch, said output lead of said summing circuit being coupled to said base of said first transistor;

a signal-input terminal, said input terminal being coupled to said source;

second and third capacitors;

an amplifier having an input lead and an output lead, said input lead of said amplifier being coupled to said output lead of said summing circuit, said second capacitor being connected between said input lead of said amplifier and said output lead of said amplifier;

a field-effect transistor having a source, a drain and a gate, a first lead of said third capacitor being connected to said output lead of said amplifier, a second lead of said third capacitor being connected to said source of said field-effect transistor, said drain of said field-effect transistor being connected to said input lead of said amplifier;

a third speed-control terminal, said third speed-control terminal being coupled to said gate of said field-effect transistor, said output lead of said amplifier being coupled to said emitter of said first transistor;

differentiating means;

first and second latching means each having first and second input leads and an output lead, said differentiating means being connected between said signal-input terminal and said first input leads of said first and said second latching means;

a flip-flop having first and second input leads and first and second output leads, said output lead of said first latching means being connected to said first input lead of said flip-flop, said second output lead of said flip-flop being connected to said second input lead of said first latching means; and a NAND-gate having first and second input leads and an output lead, said output lead of said second latching means being connected to said first input lead of said gate, said first output lead of said flip-flop being connected to said second input lead of said gate, said second input lead of said second latching means being connected to said output lead of said gate, said second input lead of said flip-flop being coupled to said oscillator output lead, said output lead of said NAND-gate being connected to said enable-input lead of said latch.

12. A phase-locked oscillator for use with a source of data signals as defined in claim 1 including:

a 3-bit latch having first, second and third set-input leads, an enable-input lead and first, second and third output leads;

a counter having an input lead and first, second and third output leads, said output leads of said counter each being connected to a corresponding one of said set-input leads of said latch;

a summing circuit having first, second and third input leads and an output lead, each of said input leads of said summing circuit being connected to a corresponding one of said output leads of said latch, said output lead of said summing circuit being coupled to said base of said first transistor;

a signal-input terminal, said input terminal being coupled to said source;

second and third capacitors;

an amplifier having an input lead and an output lead, said input lead of said amplifier being coupled to said output lead of said summing circuit, said second capacitor being connected between said input lead of said amplifier and said output lead of said amplifier;

a field-effect transistor having a source, a drain and a gate, a first lead of said third capacitor being connected to said output lead of said amplifier, a second lead of said third capacitor being connected to said source of said field-effect transistor, said drain of said field-effect transistor being connected to said input lead of said amplifier;

a third speed-control terminal, said third speed-control terminal being coupled to said gate of said field-effect transistor, said output lead of said amplifier being coupled to said emitter of said first transistor;

differentiating means;

first and second latching means each having first and second input leads and an output lead, said differentiating means being connected between said signal-input terminal and said first input leads of said first and said second latching means;

a flip-flop having first and second input leads and first and second output leads, said output lead of said first latching means being connected to said first input lead of said flip-flop, said second output lead of said flip-flop being connected to said second input lead of said first latching means;

a NAND-gate having first and second input leads and an output lead, said output lead of said second latching means being connected to said first input lead of said gate, said first output lead of said flip-flop being connected to said second input lead of said gate, said second input lead of said second latching means being connected to said output lead of said gate, said output lead of said gate being connected to said enable-input lead of said latch; and a frequency divider having a signal-input terminal, a signal-output terminal and first, second and third control terminals, said input terminal of said divider being coupled to said oscillator output lead, said output terminal of said divider being coupled to said second input lead of said flip-flop and to said input lead of said counter.

* * * * *